US011653003B2

(12) United States Patent
Kwong et al.

(10) Patent No.: US 11,653,003 B2
(45) Date of Patent: May 16, 2023

(54) SYSTEM AND METHOD FOR PROCESSING A STREAM OF IMAGES

(71) Applicant: City University of Hong Kong, Kowloon (HK)

(72) Inventors: Sam Tak Wu Kwong, Quarry Bay (HK); Shiqi Wang, Kowloon (HK); Yi Chen, Kowloon (HK)

(73) Assignee: City University of Hong Kong, Kowloon (HK)

( * ) Notice: Subject to any disclaimer, the term of this patent is extended or adjusted under 35 U.S.C. 154(b) by 80 days.

(21) Appl. No.: 17/378,022

(22) Filed: Jul. 16, 2021

(65) Prior Publication Data

US 2023/0028249 A1 Jan. 26, 2023

(51) Int. Cl.
 *H04N 19/147* (2014.01)
 *H04N 19/124* (2014.01)
 *H04N 19/103* (2014.01)
 *H04N 19/136* (2014.01)
 (Continued)

(52) U.S. Cl.
 CPC ......... *H04N 19/147* (2014.11); *H04N 19/102* (2014.11); *H04N 19/103* (2014.11); *H04N 19/124* (2014.11); *H04N 19/136* (2014.11); *H04N 19/184* (2014.11)

(58) Field of Classification Search
 CPC .. H04N 19/147; H04N 19/102; H04N 19/103; H04N 19/124; H04N 19/136; H04N 19/184
 See application file for complete search history.

(56) References Cited

U.S. PATENT DOCUMENTS

| 6,831,947 B2 | 12/2004 | Corbera |
| 8,064,517 B1 | 11/2011 | Viscito et al. |
| 8,532,169 B2 | 9/2013 | Wang et al. |

(Continued)

FOREIGN PATENT DOCUMENTS

| CN | 101959065 | 6/2012 |
| DE | 112017001540 | 12/2018 |

(Continued)

OTHER PUBLICATIONS

B. Brass, J. Chen, S. Liu, Y.-K. Wang, Versatile Video Coding (Draft 4), Joint Video Exploration Team (JVET), doc. JVET-M1001 (2019).

(Continued)

*Primary Examiner* — Joseph Suh
(74) *Attorney, Agent, or Firm* — Renner Kenner Greive Bobak Taylor & Weber (57) ABSTRACT

A method for processing a stream of images including the steps of obtaining coding information from the stream of images to determine one or more bitrate/distortion models representative of the bitrate/distortion relationship of the stream of images, determining a set of coding parameters arranged for use to encode a stream of images with the one or more bitrate/distortion models, reformulating the bitrate/distortion relationship into a decoupled relationship arranged to be applied to a subset of the stream of images, and using the decoupled relationship and the set of coding parameters to generate an adaptive quantization parameter for encoding the stream of images with the bitrate/distortion relationship.

22 Claims, 7 Drawing Sheets

(51) Int. Cl.
H04N 19/184 (2014.01)
H04N 19/102 (2014.01)

(56) References Cited

U.S. PATENT DOCUMENTS

| | | | |
|---|---|---|---|
| 8,761,247 | B2 | 6/2014 | Bock et al. |
| 2007/0206674 | A1* | 9/2007 | Ziauddin ............... H04N 19/61 375/E7.181 |
| 2015/0350276 | A1* | 12/2015 | Karlsson .......... H04N 21/44004 709/231 |
| 2017/0347100 | A1* | 11/2017 | Chou .................. H03M 7/3059 |
| 2017/0365237 | A1* | 12/2017 | Koneru ..................... G06T 1/20 |
| 2018/0139450 | A1* | 5/2018 | Gao ..................... H04N 19/147 |
| 2018/0143257 | A1* | 5/2018 | Garcia ................ G01R 31/382 |
| 2019/0302734 | A1* | 10/2019 | Agarwal ............ G05B 19/4097 |
| 2019/0366191 | A1* | 12/2019 | Sohl ..................... G06F 3/0482 |
| 2020/0410027 | A1* | 12/2020 | Olive ................. G06F 16/9536 |
| 2021/0027461 | A1* | 1/2021 | Santos ..................... G06T 7/62 |
| 2021/0067808 | A1* | 3/2021 | Schroers ............... H04N 19/12 |
| 2021/0132947 | A1* | 5/2021 | John .................... G06K 9/6272 |
| 2021/0336632 | A1* | 10/2021 | Bergland ............ H03M 7/3059 |
| 2022/0036411 | A1* | 2/2022 | Tan ........................ G06F 17/18 |
| 2022/0038684 | A1* | 2/2022 | Urban ................. H04N 19/176 |

FOREIGN PATENT DOCUMENTS

| | | |
|---|---|---|
| KR | 101801255 | 11/2017 |
| TW | 201924336 | 6/2019 |
| WO | 2019152346 | 8/2019 |
| WO | 2020089702 | 5/2020 |

OTHER PUBLICATIONS

H. Huang, K. Zhang, Y.-W. Huang, S. Lei, Quadtree plus binary tree structure integration with jem tools, JVET C0024 (2016).
X. Li, H.-C. Chuang, J. Chen, M. Karczewicz, L. Zhang, X. Zhao, A. Said, Multi-Type-Tree, Joint Video Exploration Team (JVET), doc. JVET-D0117 (2016).
F. Racape, G. Rath, F. Urban, L. Zhao, S. Liu, X. Zhao, X. Li, A. Filippov, V. Rufitskiy, J. Chen, Wide-angle intra prediction for non-square blocks, JVET K0500 (2018).
F. Zou, J. Chen, M. Karczewicz, X. Li, H.-C. Chuang, W.-J. Chien, Im-proved affine motion prediction, Joint Video Exploration Team (JVET), doc. JVET-D0128 (2016).
X. Zhao, J. Chen, M. Karczewicz, A. Said, V. Seregin, Joint separable and non-separable transforms for next-generation video coding, IEEE Transactions on Image Processing 27 (5) (2018) 2514-2525.
J. Chen, Y. Ye, S. Kim, Algorithm description for Versatile Video Coding and Test Model 4 (VTM 4), Joint Video Exploration Team (JVET), doc. JVET-M1002 (2019).
N. Choi, Y. Piao, K. Choi, C. Kim, CE 3.3 related: Intra 67 modes coding with 3 MPM, Joint Video Exploration Team (JVET), doc JVET-K0529 (2018).
B. Bross, H. Schwarz, D. Marpe, T. Wiegand, CE3: Multiple reference line intra prediction, Joint Video Exploration Team (JVET), doc. JVET-K0051 (2018).
J. Li, M. Wang, L. Zhang, K. Zhang, S. Wang, S. Wang, S. Ma, W. Gao, Sub-sampled cross-component prediction for chroma component coding, in: 2020 Data Compression Conference (DCC), IEEE, 2020, pp. 203-212.
K. Zhang, J. Chen, L. Zhang, X. Li, M. Karczewicz, Enhanced cross-component linear model for chroma intra-prediction in video coding, IEEE Transactions on Image Processing 27 (8) (2018) 3983-3997.
T. Poirier, F. L. Leannec, P. Bordes, CE10 related:multiple prediction unit shapes. , Joint Video Exploration Team (JVET), doc. JVET-L0208 (2018).
A. Tamse, S. Jeong, M. W. Park, C. K. (Samsung), CE4: Adaptive Motion Vector Resolution in JVET-J0024 (Test 4.3.5), Joint Video Exploration Team (JVET), doc. JVET-K0116 (2018).

J. Stankowski, C. Korzeniewski, M. Domanski, T. Grajek, Rate-distortion optimized quantization in hevc: Performance limitations, in: 2015 Picture coding symposium (PCS), IEEE, 2015, pp. 85-89.
M. Karczewicz, W.-J. C. L. Zhang, X. Li, Improvements on adaptive loop filter, Joint Video Exploration Team (JVET), doc. JVET-B0060 (2018).
K. Andersson, P. Wennersten, J. Samuelsson, J. Strom, P. Hermansson, M. Pettersson, AHG 3 Recommended settings for HM, Joint Collabo-rative Team on Video Coding (JCTVC), doc. JCTVC-X0038 (2016).
C. Pang, O. C. Au, F. Zou, X. Zhang, W. Hu, P. Wan, Optimal dependent bit allocation foravs intra-frame coding via successive convex approx-imation, in: 2013 IEEE International Conference on Image Processing, IEEE, 2013, pp. 1520-1523.
C. Pang, O. C. Au, J. Dai, F. Zou, Dependent joint bit allocation for h. 264/avc statistical multiplexing using convex relaxation, IEEE transactions on circuits and systems for video technology 23 (8) (2013) 1334-1345.
S. Li, C. Zhu, Y. Gao, Y. Zhou, F. Dufaux, M.-T. Sun, Inter-frame dependent rate-distortion optimization using lagrangian multiplier adap-tion, in: 2015 IEEE International Conference on Multimedia and Expo (ICME), IEEE, 2015, pp. 1-6.
S. Li, C. Zhu, Y. Gao, Y. Zhou, F. Dufaux, M.-T. Sun, Lagrangian multiplier adaptation for rate-distortion optimization with inter-frame dependency, IEEE Transactions on Circuits and Systems for Video Technology 26 (2015) 117-129.
Y. Gao, C. Zhu, S. Li, T. Yang, Temporally dependent rate-distortion optimization for low-delay hierarchical video coding, IEEE Transactions on Image Processing 26 (9) (2017) 4457-4470.
Y. Gao, C. Zhu, S. Li, T. Yang, Source distortion temporal propagation analysis for random-access hierarchical video coding optimization, IEEE Transactions on Circuits and Systems for Video Technology 29 (2) (2017) 546-559.
T. Zhao, Z. Wang, C. W. Chen, Adaptive quantization parameter cascad-ing in hevc hierarchical coding, IEEE Transactions on Image Processing 25 (7) (2016) 2997-3009.
T. Zhao, Z. Wang, S. Kwong, Flexible mode selection and complexity allocation in high efficiency video coding, IEEE Journal of Selected Topics in Signal Processing 7 (6) (2013) 1135-1144.
S. Hu, H. Wang, S. Kwong, T. Zhao, C.-C. J. Kuo, Rate control opti-mization for temporal-layer scalable video coding, IEEE Transactions on Circuits and Systems for Video Technology 21 (8) (2011) 1152-1162.
Y. Xu, S. Yi, L. Lin, W. Chen, T. Zhao, Gop structure-independent quantization parameter cascading in video coding, IEEE Access 7 (2019) 76274-76282.
Y. Gong, S. Wan, K. Yang, Y. Yang, B. Li, Rate-distortion-optimization-based quantization parameter cascading technique for random-access configuration in h. 265/hevc, IEEE Transactions on Circuits and Systems for Video Technology 27 (6) (2016) 1304-1312.
B. Li, H. Li, L. Li, J. Zhang, $\lambda$ domain rate control algorithm for high efficiency video coding, IEEE transactions on Image Processing 23 (9) (2014) 3841-3854.
J. He, E.-H. Yang, F. Yang, K. Yang, Adaptive quantization parameter selection for h. 265/hevc by employing inter-frame dependency, IEEE Transactions on Circuits and Systems for Video Technology 28 (12) (2017) 3424-3436.
H. Amer, E.-h. Yang, Adaptive quantization parameter selection for low-delay hevc via temporal propagation length estimation, Signal Processing: Image Communication (2020) 115826.
S. Ma, W. Gao, Y. Lu, Rate-distortion analysis for h. 264/avc video coding and its application to rate control, IEEE transactions on circuits and systems for video technology 15 (12) (2005) 1533-1544.
F. Bossen, J. Boyce, X. Li, V. Seregin, K. Suhring, JVET common test conditions and software reference configurations for SDR video, Joint Video Exploration Team (JVET), doc. JVET-M1010 (2019).
G. Bjontegaard, Calculation of average PSNR differences between RD-curves, ITU-T VCEG Meeting, Austin, Texas, USA, Tech. Rep, doc. VCEG-M33 (2001).

* cited by examiner

SYSTEM AND METHOD FOR PROCESSING A STREAM OF IMAGES

TECHNICAL FIELD

The present invention relates to a system and method for processing a stream of images, and particularly, although not exclusively, to a video coder/decoder (codec) system which can improve coding and decoding performance.

BACKGROUND

The consumption of multimedia has increased substantially in recent times with the advances and adoption of social media platforms. As more and more users are using these platforms to shoot and share multimedia files, there is also a greater expectation of video quality and streaming speed, both of which are demanded by content hungry modern internet users.

These increase in demands also causes substantial demands on communication networks as a substantial amount of bandwidth and network capacity is required to stream multimedia. Thus, to increase the efficiency of transmitting digital multimedia over a network, developers such as the Moving Pictures Experts Group (MPEG) have developed compression standards to reduce the size of video streams such that they can be transmitted and stored with lower uses of resources. In turn, this has allowed a greater volume of video information to be transmitted and shared over the internet or other communication networks.

However, despite these advances, there is a constant increase and demand for multimedia, as well as the constant improvements in quality of videos. In turn, development of compression systems will need to continue to improve in order to satisfy the ever-growing consumers of multimedia and social media.

SUMMARY OF THE INVENTION

In accordance with a first aspect of the present invention, there is provided a method for processing a stream of images comprising the steps of:
- obtaining coding information from the stream of images to determine one or more bitrate/distortion models representative of the bitrate/distortion relationship of the stream of images,
- determining a set of coding parameters arranged for use to encode a stream of images with the one or more bitrate/distortion models,
- reformulating the bitrate/distortion relationship into a decoupled relationship arranged to be applied to a subset of the stream of images, and using the decoupled relationship and the set of coding parameters to generate an adaptive quantization parameter for encoding the stream of images with the bitrate/distortion relationship.

In an embodiment of the first aspect, the step of reformulate the bitrate/distortion relationship into a decoupled relationship applicable for a subset of the stream of images includes the use of the one or more bitrate/distortion models with the set of coding parameters.

In an embodiment of the first aspect, the one or more bitrate/distortion models include a dependency model and an inherent model.

In an embodiment of the first aspect, the dependency model is arranged to model a relationship of a distortion and bitrate in encoding the stream of images such that the model represents the effects of the reference frames on the be coded frame given the set of coding parameters.

In an embodiment of the first aspect, the dependency model is further arranged to model the distortion of the to be coded frame and the distortion of the reference frame.

In an embodiment of the first aspect, the dependency model includes of the bits of the to be coded frame and the bits of the reference frame.

In an embodiment of the first aspect, the dependency model is represented by:

$$D_i = \sum_{j \in R(i)} \mu_{i,j,D} D_j + D'_i.$$

$$R_i = \sum_{j \in R(i)} \mu_{i,j,R} D_j + R'_i,$$

where $D_i$, $R_i$ and $R(i)$ are the distortion, bits and reference picture set of to-be-coded frame;
$D_j$ is the distortion of reference frame;
$\mu_{i,j,D}$ and $\mu_{i,j,R}$ are parameters of dependency models;
$D'_i$ and $R'_i$ are the distortion and bits of to-be-coded frame when referring to lossless reference frame;
$D'_i$ and $R'_i$ are only related to frame content; and,
QP set to the to-be-coded frame.

In an embodiment of the first aspect, the dependency models are linear.

In an embodiment of the first aspect, the inherent model refers to the application of lossless reference frames to the bitrate/distortion models.

In an embodiment of the first aspect, the step of generating the adaptive quantization parameter is performed by using a QP-λ relationship and the decoupled relationship.

In an embodiment of the first aspect, the QP-λ relationship is derived from the inherent model.

In an embodiment of the first aspect, the QP is represented by:

$$QP = \frac{\log_2 \lambda - \log_2\left(-\frac{6 \cdot MAX_f^2 \cdot \ln 10 \cdot c \cdot 2^{(\gamma/6)}}{a \cdot SATD \cdot \ln 2 \cdot 10}\right) + \frac{d \cdot \log_2 10}{10}}{\frac{1}{6} - \frac{c \cdot \log_2 10}{10}},$$

In an embodiment of the first aspect, the bitrate/distortion relationship is the weighted sum of the inherent model.

In an embodiment of the first aspect, the method is used in a codec/decode.

In an embodiment of the first aspect, the codec/decode is the Versatile Video Coding (VVC).

In accordance with a second aspect of the present invention, there is provided a system for processing a stream of images comprising:
- a decoding processor arranged to obtain coding information from the stream of images to determine one or more bitrate/distortion models representative of the bitrate/distortion relationship of the stream of images;
- a parameter estimation processor arranged to determine a set of coding parameters arranged for use to encode a stream of images with the one or more bitrate/distortion models; and,
- a quantization parameter processor arranged to reformulate the bitrate/distortion relationship into a decoupled relationship arranged to be applied to a subset of the stream of images, and using the decoupled relationship and the set of coding parameters to determine an adaptive quantization parameter for an encoder to encode the stream of images with the bitrate/distortion relationship.

In an embodiment of the second aspect, the quantization parameter processor is arranged to use of the one or more bitrate/distortion models with the set of coding parameters to reformulate the bitrate/distortion relationship into a decoupled relationship.

In an embodiment of the second aspect, the one or more bitrate/distortion models include a dependency model and an inherent model.

In an embodiment of the second aspect, the dependency model is arranged to model a relationship of a distortion and bitrate in encoding the stream of images such that the model represents the effects of the reference frames on the to be coded frame given the set of coding parameters.

In an embodiment of the second aspect, the dependency model is further arranged to model the distortion of the to be coded frame and the distortion of the reference frame.

In an embodiment of the second aspect, the dependency model includes of the bits of the to be coded frame and the bits of the reference frame.

In an embodiment of the second aspect, the dependency model is represented by:

$$D_i = \sum_{j \in R(i)} \mu_{i,j,D} D_j + D'_i.$$

$$R_i = \sum_{j \in R(i)} \mu_{i,j,R} D_j + R'_i,$$

where $D_i$, $R_i$ and $R(i)$ are the distortion, bits and reference picture set of to-be-coded frame;
$D_j$ is the distortion of reference frame;
$\mu_{i,j,D}$ and $\mu_{i,j,R}$ are parameters of dependency models;
$D'_i$ and $R'_i$ are the distortion and bits of to-be-coded frame when referring to lossless reference frame;
$D'_i$ and $R'_i$ are only related to frame content; and,
QP set to the to-be-coded frame.

In an embodiment of the second aspect, the dependency models are linear.

In an embodiment of the second aspect, the inherent model refers to the application of lossless reference frames to the bitrate/distortion models.

In an embodiment of the second aspect, the step of generating the adaptive quantization parameter is performed by using a QP-λ relationship and the decoupled relationship.

In an embodiment of the second aspect, the QP-λ relationship is derived from the inherent model.

In an embodiment of the second aspect, the QP is represented by:

$$QP = \frac{\log_2 \lambda - \log_2\left(-\frac{6 \cdot \text{MAX}_f^2 \cdot \ln 10 \cdot c \cdot 2^{(\gamma/6)}}{a \cdot SATD \cdot \ln 2 \cdot 10}\right) + \frac{d \cdot \log_2 10}{10}}{\frac{1}{6} - \frac{c \cdot \log_2 10}{10}},$$

In an embodiment of the second aspect, the bitrate/distortion relationship is the weighted sum of the inherent model.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
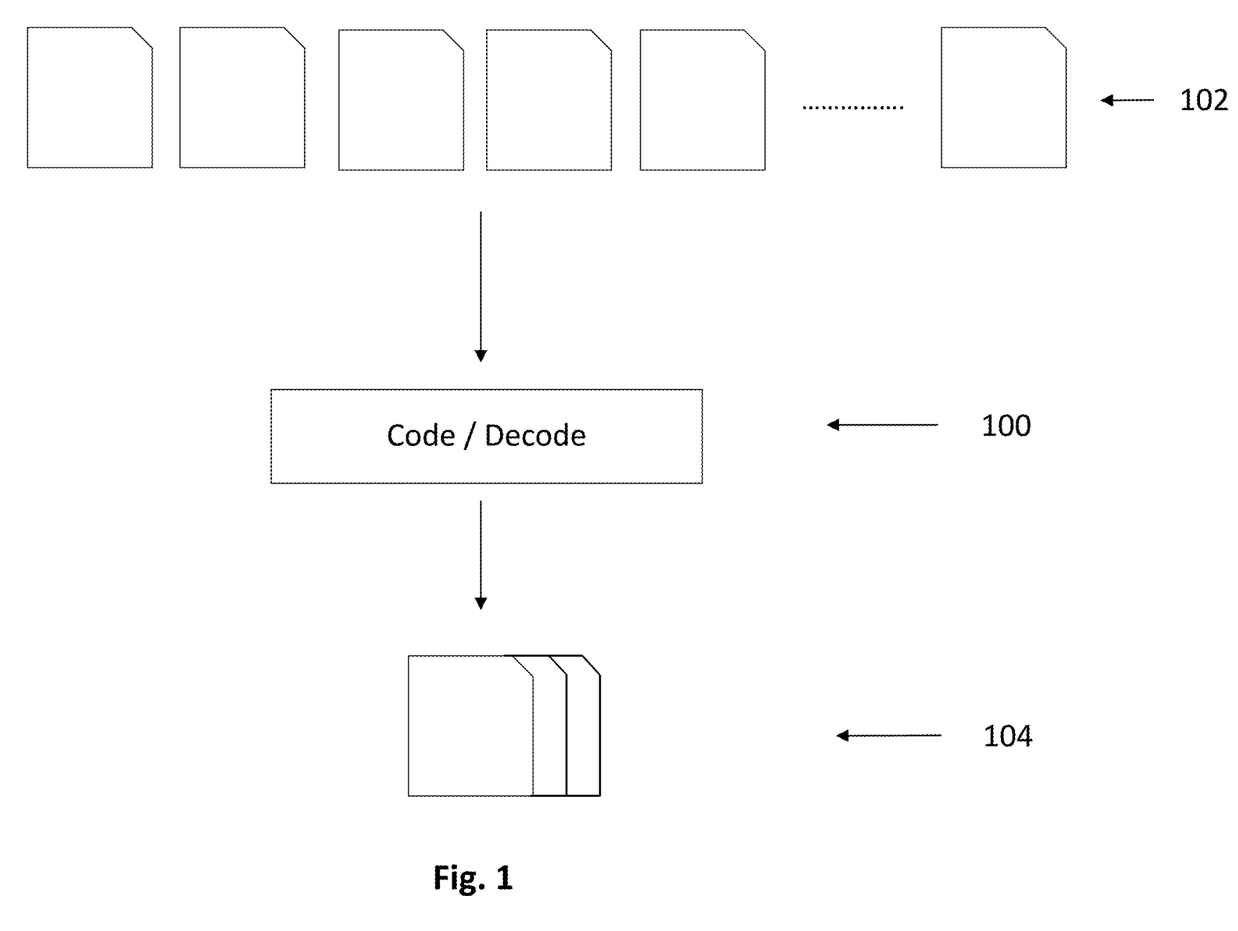
FIG. 1 is a block diagram of an example code/decode system.

Referring to FIG. 1, there is illustrated a block diagram showing the operation of a code/decode system. Such a system may be used to code or decode a stream of images on a computer or video capture, play or editing apparatus. In a typical scenario, a stream of images, which make up a video, is streamed from a camera or as an image input in which a raw stream of images (images captured from a camera sensor) as raw digital data. This data is immediately compressed into a different digital format so as to reduce the size of the stream of images and thus allowing it to be transmitted or stored. This compression process is helpful as compressing a stream of images from its raw format saves substantial storage and transmission resources.

For the code/decode system 100 to operate, a stream of images 102 may be processed by identifying different frames within the stream of images and identifying how these frames are different. In turn, by marking these differences, the raw format of each image does not need to be stored, but may have only certain frames, known as reference frames, to be stored, followed by storing how the subsequent frames change from the reference frames. This is known as inter-frame compression.

For each frame, an intra-frame compression may take place whereby the image is compressed as a single image, that is, each frame may be compressed with the data within the still image only. However, in order to compress the stream of images 102, a comparison between the surrounding frames of a reference image may be performed, and similarities or movement of items within the image may be identified and used as compression points in order to enhance the compression of the stream of images.

The code/decode system 100 may be implemented as software or hardware and may be operated by a computing device or dedicated processor which may exist on a computer, camera, smartphone, media player or video playing, editing or streaming apparatus. In turn, it may receive a stream of images 102 and compress these in accordance with the compression standards of the code/decode system 100 to generate a compressed video file 104.

One such code/decode is known as Versatile Video Coding (VVC) standard. Driven by the increasing demand in high efficiency video compression, the VVC standard, developed by Joint Video Exploration Team from ITU-T VCEG and ISO/IEC MPEG has achieved superior coding performance compared to the High Efficiency Video Coding (HEVC). In particular, a series of advanced coding tools have been adopted in VVC, including a Quadtree-plus-Binary-Tree (QTBT) split, multi-type-tree split (MTT), wide-angle intra prediction for non-square block, affine motion compensation and joint separable and non-separable transforms, resulting in significant performance improvement in terms of coding efficiency.

In some example configurations, video encoding may adopt a constant quantization parameter (CQP) when there is no constraint on the bit rate. In the CQP scheme, the QP for each frame is adjusted based on the reference level only. However, this may not lead to the optimal rate-distortion (RD) performance in general as the video content has been largely ignored. In addition to the incorporation of new coding tools, adaptive quantization parameter (QP) selection based on the video content has been widely recognized to be effective. At the frame-level, rate-distortion optimization (RDO) is employed in an effort to assign different QPs and Lagrange-multipliers $\lambda$s to different frames within the current Group of Pictures (GOP), aiming at maximizing GOP-level R-D performance.

$$Q = \{QP_1, \ldots, QP_n\}$$

$$\arg\min_{Q} J = \sum_{i=1}^{n} D_i + \lambda \left( \sum_{i=1}^{n} R_i \right),$$

where J is the total RD cost of current GOP and $\lambda$ is the Lagrange-multiplier that balances the GOP-level trade-off between R and D. For each frame, QP could be selected according to the established RD models that are adaptive to the video content (e.g., spatial and temporal characteristics).

The present invention relates to a system and method for processing a stream of images and may, in some embodiments, be implemented as a code/decode system 100 or method for the encoding or decoding of a stream of images 102 or video file. The implementation of the system and method for processing a stream of images may be implemented in software, hardware, or any combination of both. An example embodiment of a system and method for processing a stream of images 200 is described below with reference to FIG. 2, and its operation and proof is described below with reference to FIGS. 3 to 7.

Figure 2:
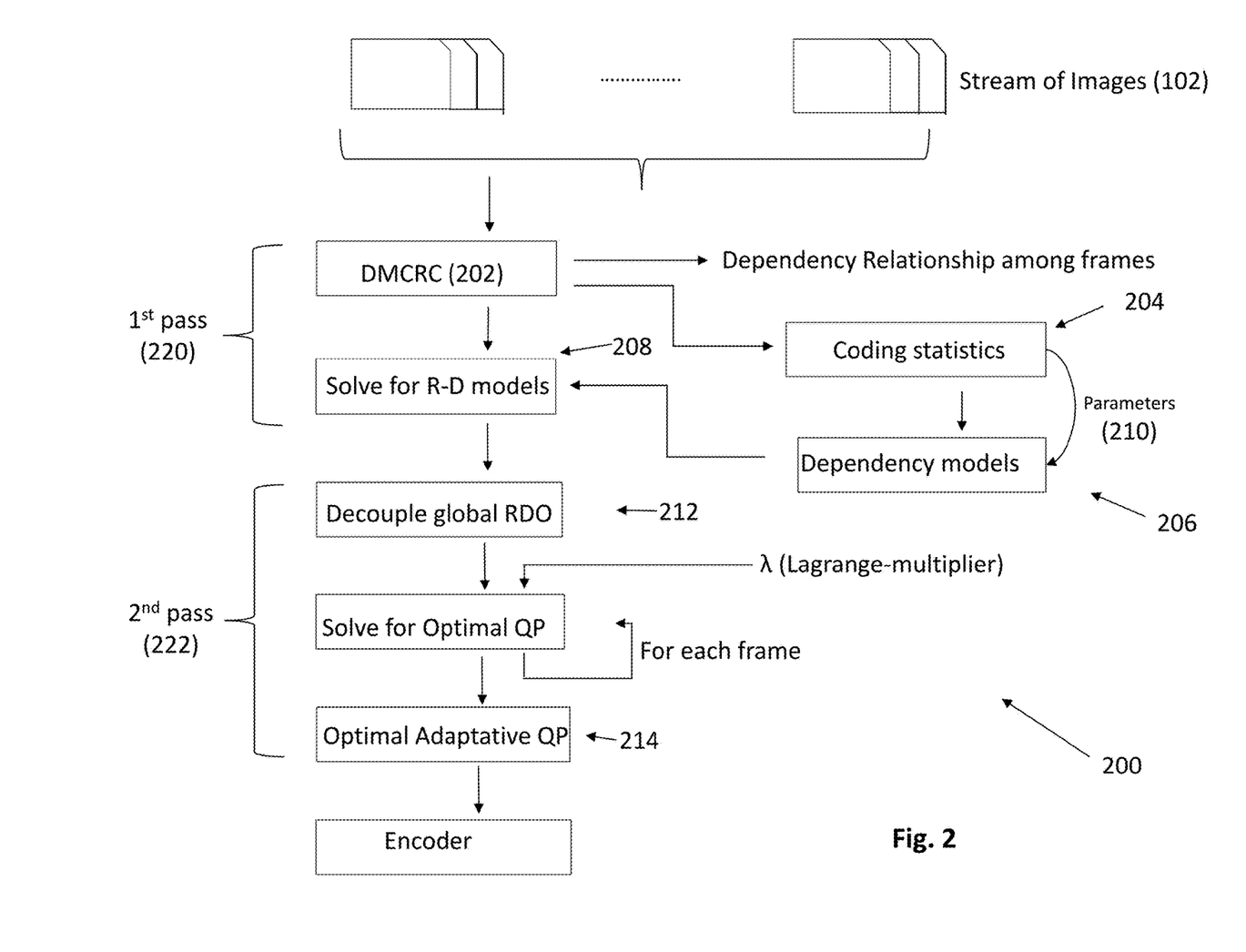
FIG. 2 is a block diagram of a system for processing a stream of images in accordance with one embodiment of the present invention.

With reference to FIG. 2, there is shown a block diagram of an example of a system and method for processing a stream of images comprising:

a decoding processor 202 arranged to obtain coding information 204 from the stream of images to determine one or more bitrate/distortion models 206 representative of the bitrate/distortion relationship 208 of the stream of images 102;

a parameter estimation processor arranged to determine a set of coding parameters 210 arranged for use to encode a stream of images 102 with the one or more bitrate/distortion models 206; and, a quantization parameter processor arranged to reformulate the bitrate/distortion relationship 208 into a decoupled relationship 212 arranged to be applied to a subset of the stream of images 102, and using the decoupled relationship 212 and the set of coding parameters 210 to determine an adaptive quantization parameter 214 for an encoder to encode the stream of images 102 with the bitrate/distortion relationship 208.

In a further example, the step of reformulate the bitrate/distortion relationship 208 into a decoupled relationship 212 applicable for a subset of the stream of images 102 includes the use of the one or more bitrate/distortion models 206 with the set of coding parameters 210.

In this embodiment, the system and method for processing a stream of images is arranged to provide an adaptive quantization parameter (AQP) selection scheme based on a two-pass coding strategy in VVC by exploiting the inter correlations and dependencies among frames. In particular, the first pass coding is arranged to collect sufficient coding statistics to establish the rate and distortion models that could be utilized for Rate-Distortion Optimization (RDO) which will be performed in the second-pass coding 222. Accordingly, the optimal coding parameters may be derived and thus leading to better coding performance in a variety of scenarios.

In some example embodiments the dependency among the quality of the reference frame, and the coding bits as well as the distortion of the to-be-encoded frame may be modelled in a scientifically sound way based on the statistics of the first-pass encoding. In turn, this model may be robust to scene changes and lays down the foundation for the adaptive quantization parameter selection in the second-pass coding 222.

The global RDO across different frames may also be achieved based on the precise reference relationship modelling such that the optimal QP for each frame is in turn adaptively derived. Moreover, the corresponding Lagrange multiplier may also be obtained based on the QP-$\lambda$ relationship in an effort to thoroughly optimize the RD performance.

The system as outlined in the block diagram of FIG. 2 operates as an embodiment of an adaptive quantization parameter (AQP) selection method to improve the video coding performance in which a two-pass based global Rate-distortion optimization (RDO) method is equipped to handle the dependency information in inter prediction of frames belonging to a stream of images. Experiments performed by the inventors have indicated that compared with the traditional QP configuration in Versatile Video Coding (VVC) standard, the proposed method explores the dependency relationship among frames in the first-pass coding and solve the global RDO with dependent models in the second-pass 222. In particular, the dependency between the distortion of the to-be-coded frame and the distortion of reference frame, and the dependency between the bits of to-be-coded frame and the distortion of reference frame are modelled as linear models. Accordingly, necessary coding statistics may be collected in the first-pass coding to derive the parameters of dependent models. In the second-pass coding 222, dependencies in global RDO are decoupled and optimal QP for each frame is solved with a Lagrange multiplier.

In experiments performed by the inventors, a 1.82% bitrate reduction on average for luma component can be achieved for test sequences with constant and varying scenes. In turn, demonstrating that the example embodiments of the present invention can operate as a video codec to significantly improve the coding performance which can be used in video transmission and storage with limited resource without any scene restraints, and therefore suitable for use in all types of content.

Prior to describing the operations of the method as illustrated in FIG. 2, it would be instructive to explain the concept of Reference Frame Dependency Modelling, and dependent and inherent models used in the context of Versatile Video Coding (VVS).

Versatile Video Coding

High efficiency coding tools have been adopted into the VVC standard to improve the coding performance. In intra-frame prediction, the number of angular modes has been extended to 67. For each angular mode, multiple reference line (MRL) is utilized to further remove the spatial redundancy. Regarding the samples in U and V channels, cross-component prediction has been performed to take advantage of the distribution similarities between chroma and luma channels.

For inter-frame prediction, temporal redundancy for block with irregular movement is removed by affine motion compensation. Triangle mode equips a Code Unit (CU) with two independent motion vectors by splitting the CU into two triangle blocks along diagonal or anti-diagonal directions.

Advanced motion vector resolution also enables various decisions regarding motion vector. To encode the residual information after prediction, multiple transforms, including DCT-II, DCT-VIII and DCT-VII are available for transformation and trellis-coded quantization (TCQ) have been incorporated to obtain the appropriate representation.

In addition, the reconstruction frame is enhanced by Adaptive Loop Filer (ALF), which improves the quality of reconstruction and offers better reference for future frames.

Reference Frame Dependency Modelling

Without being limited by theory, the inventors in their research and experiments have found that due to the advanced inter prediction techniques in state-of-the-art video coding standards, the bits and distortion of the current to-be-coded frame may be closely relevant to the quality of reference frames. As such, the distortion of reference frame leads to inaccurate prediction and larger residuals in the inter prediction, which further influences the coding bits and distortion of the current to-be-coded frame. In Qualitatively terms, if the reference and to-be-coded frame share higher similarities and the reference frame is encoded with better quality, smaller distortion will be observed in the to-be-coded frame.

Based on this observation, it is found in experiments that frames frequently serving as the reference should be assigned with smaller QP such that the overall distortion may be reduced. In the default hierarchical reference structure, smaller QPs are assigned to frames in lower temporal layers, which are used as reference frames by higher temporal layers, aiming at reducing the inherent distortion as well as the distortion propagated to higher temporal layers. However, in the default setting the QP for each layer may been fixed according to baseQP without any adaptation to the video content. This may potentially degrade coding efficiency as video content may affect the optimal QP.

In order to mathematically quantify the influence of reference frame distortion on the distortion and coding bits of the to-be coded frame, dependent D and R models have been considered by the inventors. As an example, the standard deviation of prediction residual in predicted frame may be modelled as a linear function of the reference distortion, QP of the to-be-coded frame as well as the frame difference.

Moreover, the Logarithmic R-D function built upon Laplacian distribution may also be used to perform RDO and derive the QP for each frame. This observation has also been tested for dependent bit allocation in video multiplexing. In other examples, the distortion of to-be-coded frame after motion compensation (MC) was found to be linearly correlated with the distortion of reference frame and the prediction residual energy after MC when the original reference frame was used for prediction.

Adaptive QP and λ may also be derived from RDO with logarithmic R-D model. The linear relationship may be further used with exponential R-D model to address the adaptive QP problem under low-delay (LD) and random access (RA) configurations in HEVC. The frame level dependent D model can also be simplified as a linear function between the reconstruction distortion of to-be-coded frame and the distortion of the reference frame. Such a model may be useful in a series of video coding optimization methods.

In experiments, the dependency factor that characterizes the influence from reference distortion on the to-be-coded frame was fixed and R-D models were used to optimize the total RD cost. Even a neural network may be trained to estimate frame-wise dependency factor by taking bits and distortion of previous GOP into account. In other examples, the first two frames of the sequence were encoded six times to obtain necessary statistics for temporal layer-level dependency factor and the hyperbolic model was adopted to reduce the total cost in RDO. Moreover, it has been proposed a pre-analysis based method to estimate dependency factor with average distortion for each temporal layer, such that the QP and λ can be directly solved from RDO. Such philosophy was also adopted for low-delay configuration, and the dependency factor was computed with encoded frames.

Dependent and Inherent R-D Models in VVC

Due to the inter prediction techniques adopted in video coding standard, the rate and distortion of the to-be-coded frame is closely relevant to the quality of its reference frame as well as the frame content. As such, by varying the QP of the reference frame, the corresponding R and D of the to-be-coded frame are characterized by the dependent models which reflect the influences of reference frame on the to-be-coded frame given the coding parameters. By contrast, when the reference frame is lossless encoded, the R and D models dependent on the QP and video content are regarded as the inherent models. As mentioned in above, linear dependent models have been experimented with in adaptive QP methods. However, these models have not been intensively studied in the context of VVC. Accordingly, in experiments performed by the inventors, it was considered that the dependent and inherent models may follow the configuration of VVC. More specifically, for inherent models, effectiveness of R and D models in for I frames and B frames with lossless reference frame are validated. An adaptive QP-λ model is then derived from inherent R and D models, which is further used in AQP scheme.

Dependent Models

To describe the dependent models, there are two kinds of dependencies, including distortion and rate dependencies, characterizing the quality of reference to the distortion and bitrate of the to-be-coded frame. Herein, the distortion is measured based on Y channel and rate is the total bits for the frame unless otherwise specified. The dependent models can be categorized according to the number of its reference frame, such as single reference frame and multiple references. It is then possible to firstly investigate the dependent R and dependent D models for frame with single reference frame (I-B case) and subsequently the dependent models for frames with two reference frames (I-B-B case).

To verify the dependent models, three sequences, BQMall, BasketballPass and BQSquare are chosen in the validation. For each sequence, default configuration is used except that it may be possible to fix the QP for the second frame (B frame) as $QP_{base}$ and vary the QP for the first frame (I frame) from $QP_{base}-5$ to $QP_{base}$. The λs for the to-be-coded frame and reference frame are calculated according to their QPs.

In the inventor's experiments, $QP_{base}$ is set to 22, 27, 32, 37 and in total the first two frames are encoded for 24 times. After encoding the two frames, the sum-of-squared-error (SSE) of reference frame, SSE and bits of the to-be-coded frame were recorded. The results are shown in FIG. 3 and FIG. 4.

Figure 3:
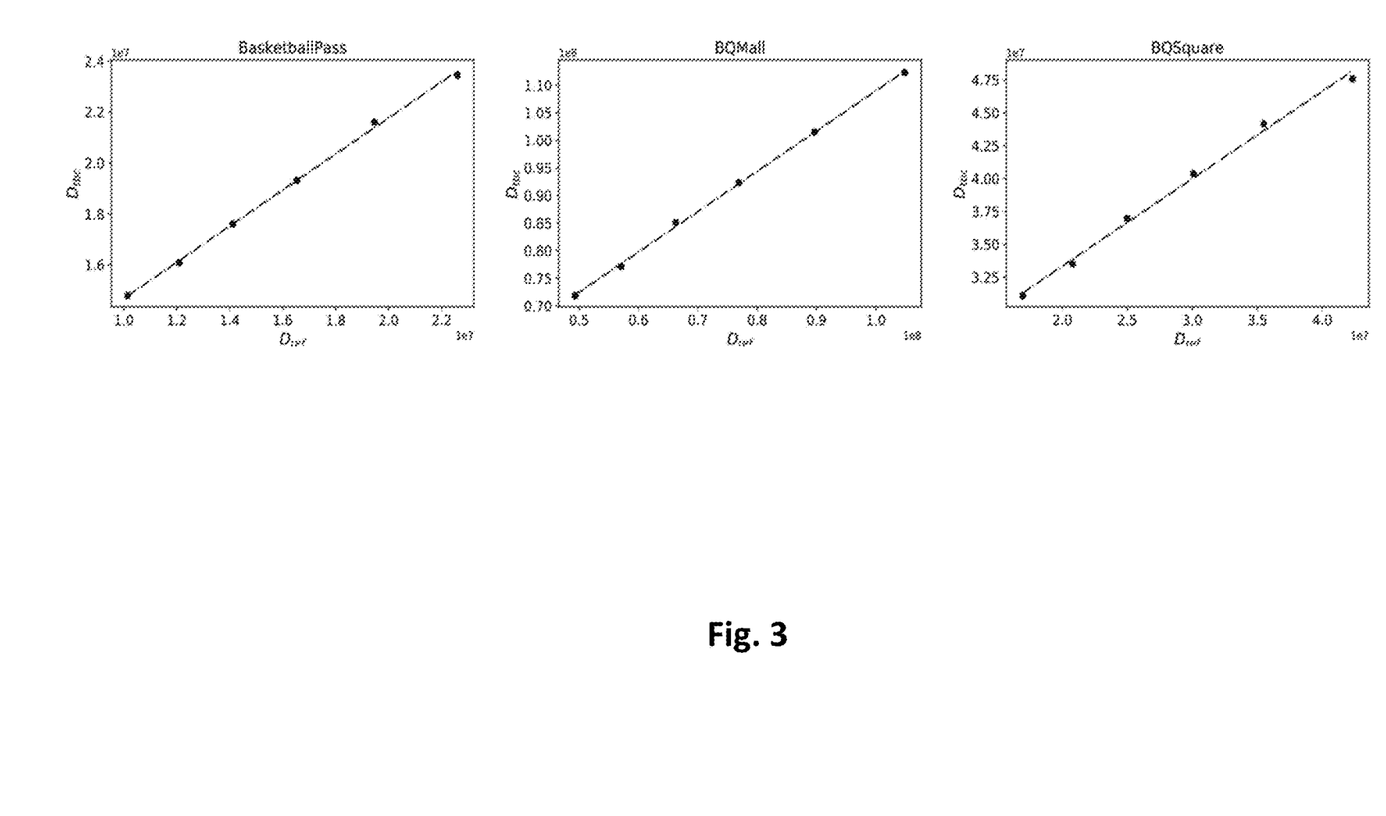
FIG. 3 provides charts illustrating the variations of coding distortion of the to-be-coded frame as a function of the SSE of a single reference frame.
Figure 4:
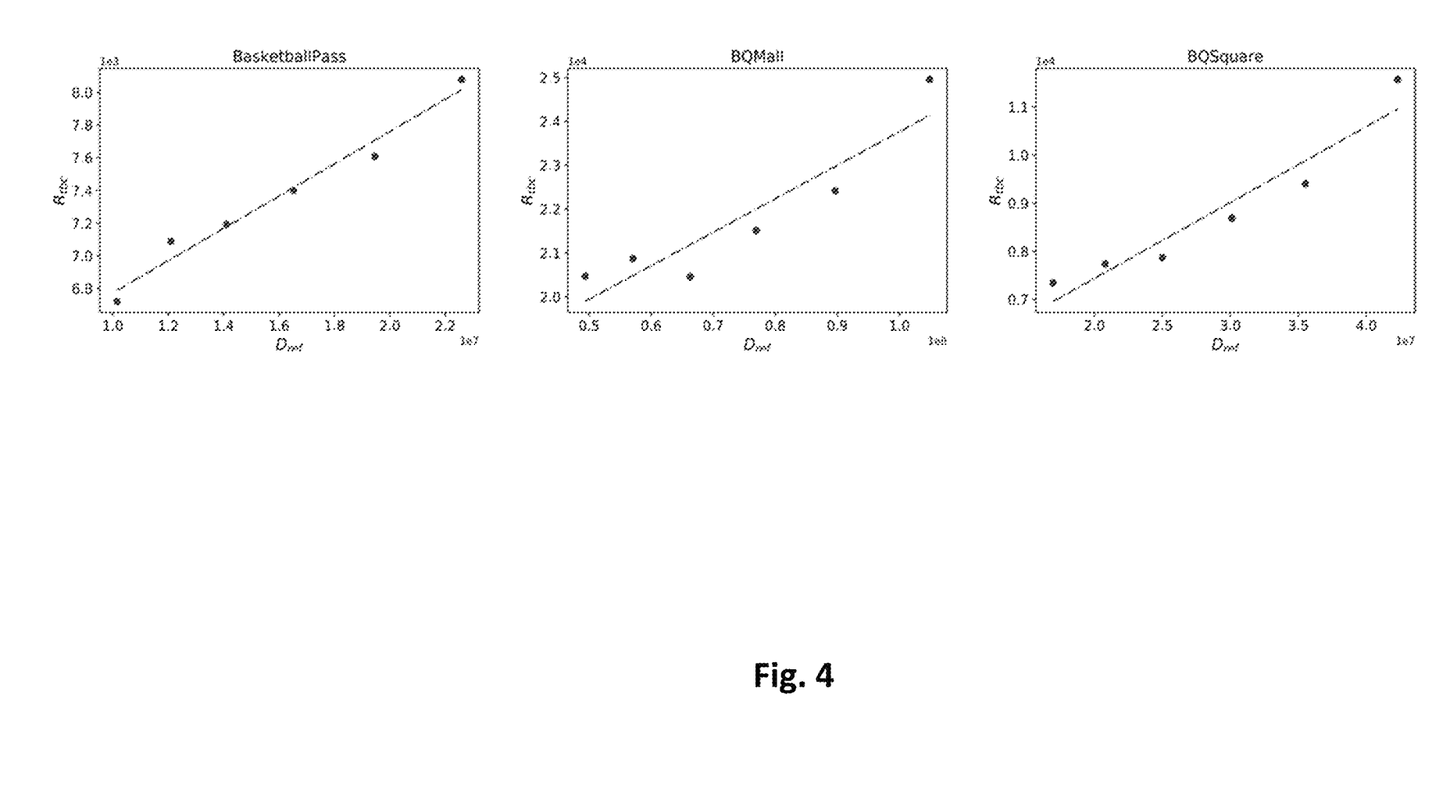
FIG. 4 provides charts which illustrate the variations of coding bits of the to-be-coded frame as a function of the SSE of a single reference frame.
Figure 5:
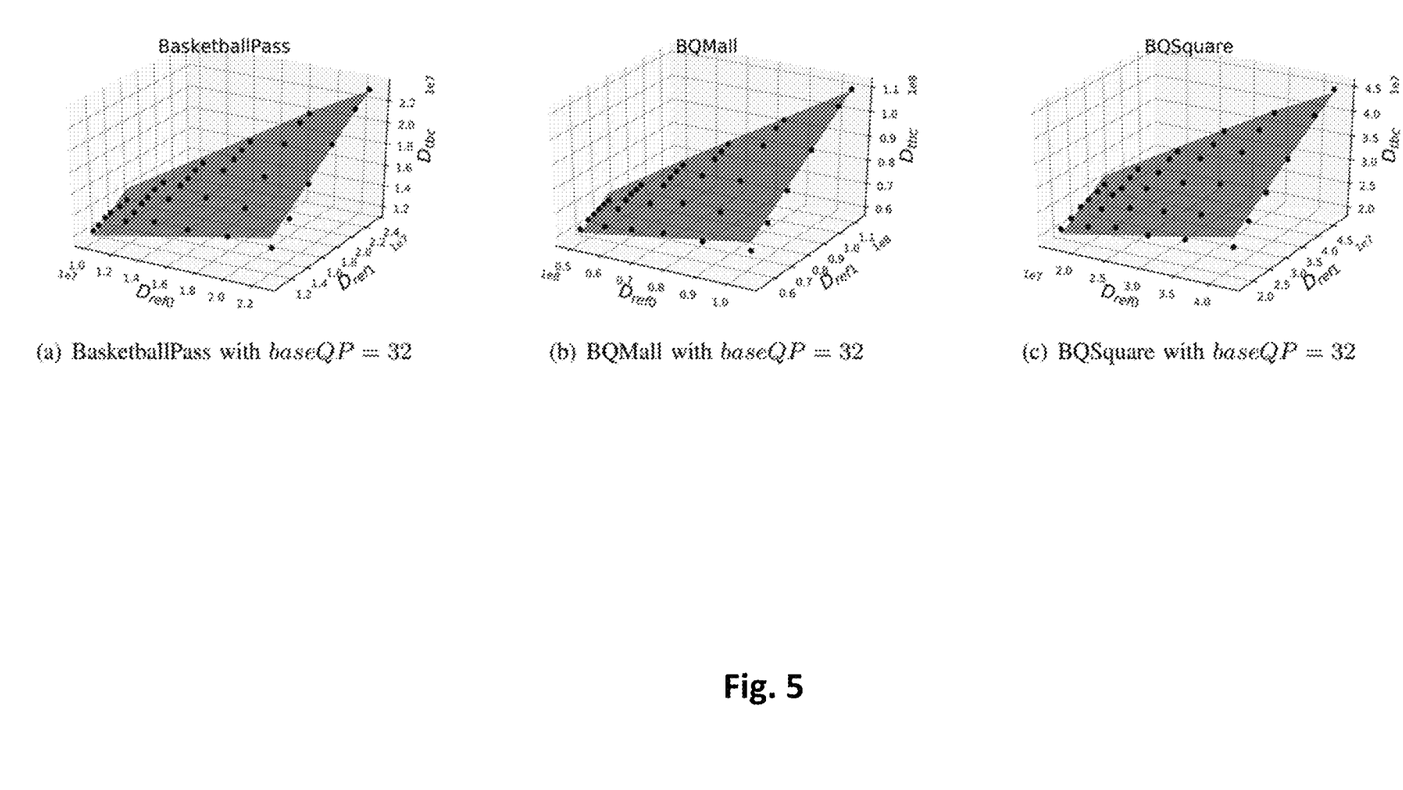
FIG. 5 provides charts which illustrate the variations of distortion of the to-be-coded frame as a function of the SSE of two reference frames.
Figure 6:
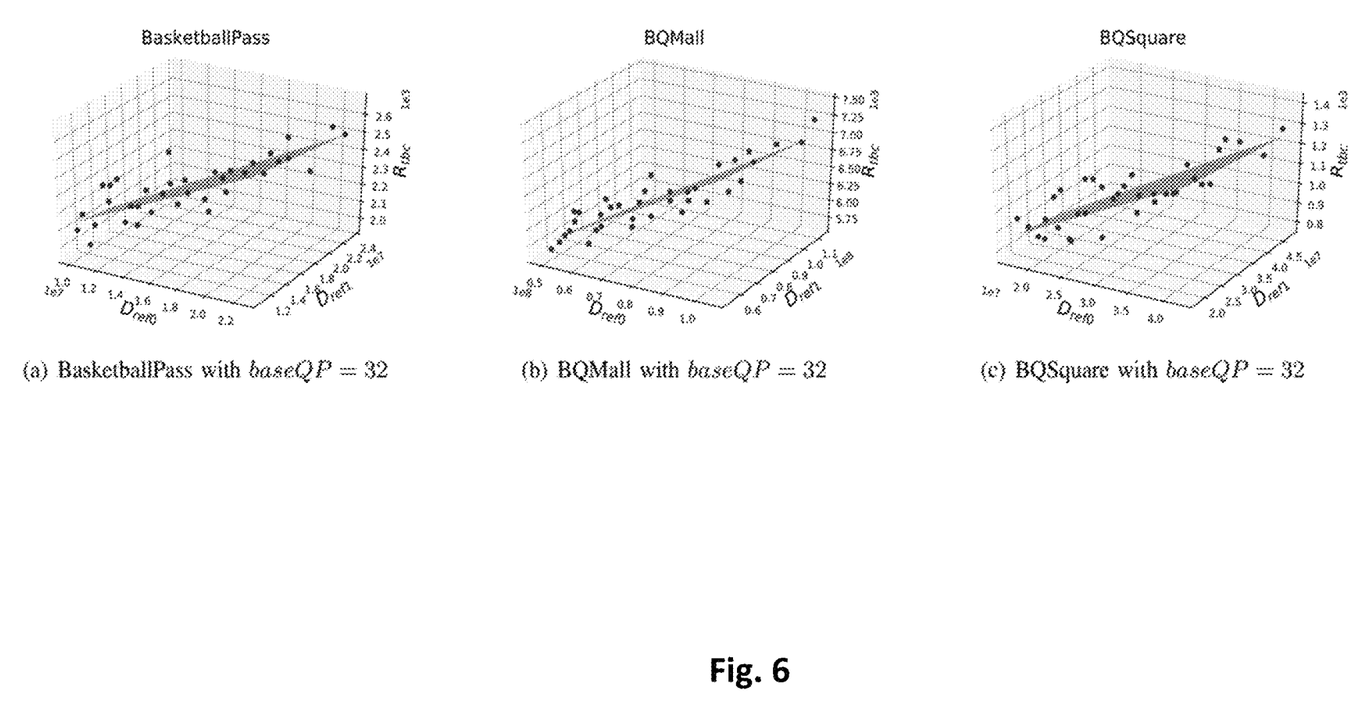
FIG. 6 provides charts which illustrates the variations of the coding bits of the to-be-coded frame as a function of the SSE of two reference frames.

From FIGS. 3 and 4, a strong linear relationship between them may be found. Similar experiments were carried out by the inventors on frames with two references and the dependent relationships are shown in FIG. 5 and FIG. 6, respectively. Therefore, linear model that may be used to represent the dependent relationships are as follows:

$$D_i = \sum_{j \in R(i)} \mu_{i,j,D} D_j + D'_i. \quad (1)$$

$$R_i = \sum_{j \in R(i)} \mu_{i,j,R} D_j + R'_i, \quad (2)$$

Where $D_i$, $R_i$ and $R(i)$ are the distortion, bits and reference picture set of to-be-coded frame, $D_j$ is the distortion of reference frame, $\mu_{i,j,D}$ and $\mu_{i,j,R}$ are parameters of dependent models, $D'_i$ and $R'_i$ are the distortion and bits of to-be-coded frame when referring to lossless reference frame. $D'_i$ and $R'_i$ are only related to frame content and QP set to the to-be-coded frame, and they are denoted as inherent models.

Inherent Models

To explore the characteristics of inherent models, validations for I frame and B frame are carried out individually. For I frame, the inherent models may be obtained directly by its rate and distortion when encoding the first frame of each sequence with QP ranging from 18 to 42. For B frame, first I frame is encoded as lossless, and then the B frame is encoded using QP from 18 to 42. The coding bits and quality in terms of bit-per-pixel (bpp) and PSNR are recorded. Following R model and D model are used to fit the coded results.

$$R = a \cdot \frac{SATD}{QS} + b, \quad (3)$$

$$Q_{PSNR} = c \cdot QP + d, \quad (4)$$

Where a,b,c,d are model parameters. QS is the quantization stepsize of to-be-coded frame, SATD is the pixel-level SATD value computed from residual. Acquired R-D datapoints together with fitted model are plotted in FIG. 7.

Figure 7:
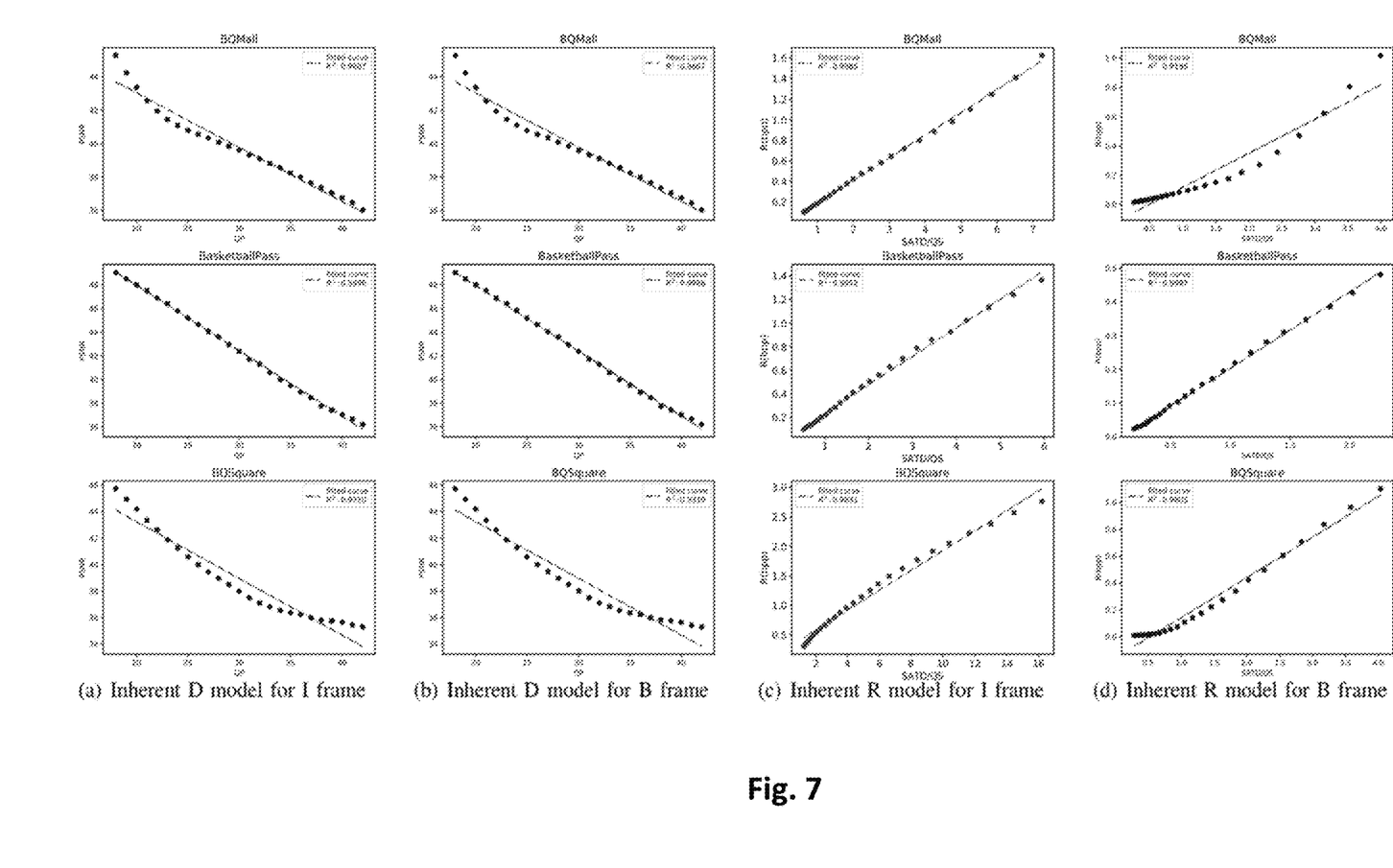
FIG. 7 provides charts which illustrates the inherent D and R models of the to-be-coded frame. In this example, the inherent D model is a function of the QP of to-be-coded frame, while the inherent R model is a function of SATD/QS. There is also a clear linear relationship for both inherent D and R models, and after fitting each plot with a linear model, coefficient of determination $R^2$ are listed in each plot.

According to FIG. 7, a relative satisfactory $R^2$ can be found for all three sequences, indicating Eq. (3) and Eq. (4) can well represent inherent R and D statistics.

As demonstrated above, the inventors have devised the two bitrate/distortion (or rate and distortion) models which models the dependency relationship and the inherent relationship. By using examples of these models, an example embodiment of a two-pass AQP method may be used to devise a suitable AQP for a stream of images. In turn, this is described with reference to the block diagram of FIG. 2 above.

In its operation, a target of the method and system is to adaptively obtain the QP at frame level given the statistics of the video content and coding behaviours through global RDO in an intra-period (IP). In particular, a global RDO is built upon the whole IP via the established rate and distortion models described above, which in one example, may be considered as the weighted sum based on each frame's inherent models. In particular, the first pass encoding obtains and records the statistics for the rate and distortion models. Subsequently, the frame-level adaptive QP is further obtained, leading to the optimal rate-distortion cost in the second pass encoding 222.

First-Pass Coding Method (220)

In this example embodiment, the first-pass coding 220 is used to characterize the R-D relationship 208. More specifically, the temporal dependency for the whole sequence is captured in the first pass coding process 220. Dual motion compensation and residual coding (DMCRC) 202 is adopted in this example, indicating that the motion compensation (MC) and residual coding (RC) are performed additionally on the original reference frame for each mode.

The design is that for CUs in non-I frame, given the motion information obtained with reconstructed reference frame, in addition to performing MC and RC with reconstructed frames, the original reference frame is used for compensation and residual coding again. Through the MCRC, the distortion of the current CU (n-th CU in m-th frame) compared to current original CU with the original reference frame can be obtained. Herein, it is denoted as $D_{m,n,ori}$ at CU level.

Moreover, the coding bits of current CU referring to lossless reference may also be obtained, which is denoted as $R_{m,n,ori}$. In addition, when using the reconstructed frame as the reference, the distortion and bits of the n-th CU in m-th frame may also be obtained, denoted as $D_{m,n,rec}$ and $R_{m,n,rec}$. In-loop filters may also be utilized after the whole frame is encoded on the reconstruction frames with lossless and lossy reference to update $D_{m,n,ori}$ and $D_{m,n,rec}$.

Default RA setting is used in the first-pass coding with some inter modes (BIO, MHintra and triangle merge) disabled. In addition, intra coding mode may also be disabled when encoding inter frames.

When performing the first-pass coding 220, if the current frame $f_m$ is an inter coding frame, $D_{m,n,ori}$, $D_{m,n,rec}$, $R_{m,n,ori}$, $R_{m,n,rec}$ and reference index are recorded for each CU. Also, frame distortion ($D_m$), bits used to encode the residual ($R_{resi,m}$), average SATD ($SATD_{ori,m}$) between inter prediction with lossless reference and original frame are obtained for each frame. $D_m$ is also measured in SSE. Otherwise, if $f_m$ is I frame, then there is only a need to record $D_m$, bits used to encode the residual $R_{resi,m}$ and average SATD $SATD_{I,m}$ between intra prediction and original frame.

Proposed Model Parameter (210) Estimation

Once obtaining the necessary coding statistics 204 in the first-pass coding 220, model parameters 210 in dependency (or dependent) models 206 (Eq. (1) and Eq. (2)) and in inherent models (Eq. (3) and Eq. (4)) can be estimated.

For dependent models 206, a reference indicator is first defined to represent whether n-th CU in $f_i$ refers to $f_j$:

$$r(n, f_j) = \begin{cases} 0, & \text{if } n\text{-th } CU \text{ in } f_i \text{ does not refer to } f_j \\ 1, & \text{if } n\text{-th } CU \text{ in } f_i \text{ refers to } f_j. \end{cases}$$

Parameters 210 in dependent models can be estimated as:

$$\mu_{i,j,D} = \frac{\sum_{r(n,f_j)=1} s_l \cdot (D_{i,n,rec} - D_{i,n,ori})}{D_j}, \quad (5)$$

$$\mu_{i,j,R} = \frac{\sum_{r(n,f_j)=1} s_l \cdot (R_{i,n,rec} - R_{i,n,ori})}{D_j}, \quad (6)$$

where $s_n$ represents the fraction of influence coming from $f_j$. If n-th CU has only one reference CU, $s_n=1$. If n-th CU has two reference CUs, $s_n$ is set to 0.5.

As for parameters 210 in inherent models, only a,c,d are needed for further computation. Frame-level residual bits consumption $R_{resi,m}$ and the SATD value ($SATD_{ori,m}$ for B frame and $SATD_{I,m}$ for I frame) are substituted into Eq. (3) to compute parameter a:

$$a = \begin{cases} \frac{R_{resi,m} \cdot QS}{M \cdot N \cdot SATD_{ori,m}}, & \text{for } B \text{ frame} \\ \frac{R_{resi,m} \cdot QS}{M \cdot N \cdot SATD_{I,m}}, & \text{for } I \text{ frame}, \end{cases}$$

where QS is the quantization stepsize used for current frame, M and N are frame width and height.

Regarding parameters 210 in Eq. (4), an observation can be made that parameter is quite stable for all sequences from FIG. 5. As such, a constant $d_c$ is adopted for all sequences. According to fitting result, de is set to 58.26 for I frame and 51.85 for B frame. Parameter c can be computed via Eq. (4) as $$c = \frac{Q_{PSNR} - d_c}{QP},$$

where $Q_{PSNR}$ and QP are the PSNR and QP of current frame from the first-pass coding respectively.

After acquiring inherent models, frame-level inherent QP-λ relationship may be computed with Eq. (3), Eq. (4), QS-QP relationship $QS=2^{(QP+y)/6}$ and PSNR-MSE relationship $$PSNR = 10 \cdot \log_{10}\left(\frac{MAX_I^2}{MSE}\right);$$

$$QP = \frac{\log_2 \lambda - \log_2\left(-\frac{6 \cdot MAX_I^2 \cdot \ln 10 \cdot c \cdot 2^{(y/6)}}{a \cdot SATD \cdot \ln 2 \cdot 10}\right) + \frac{d \cdot \log_2 10}{10}}{\frac{1}{6} - \frac{c \cdot \log_2 10}{10}}, \quad (7)$$

Dependency Decoupling in RDO (212)

Given the fact that for each frame, the distortion caused by quantization will affect not only the frame itself, but also the rate and distortion of all subsequent frames that directly or indirectly refer to this frame, the D and R of each frame in traditional RDO formula are closely related to reference relationship and the dependency factors. Typically, assuming that there are five temporal layers, from 0 to 4, in the random-access (RA) structure. As a general example, it can be assumed that frames in layer 0 consist of periodical I frame and 16-th B frame in a GOP. Accordingly, it can be denoted that these layers as $L_I$, $L_0$ ... $L_4$, where $L_I$ and $L_0$ indicate I frames and B frames in level 0, respectively.

By iteratively incorporating dependent R model (Eq. (2)) into the rate of reference frame, it may be derived that the intra-period (IP) level rate as follows, $$R_{IP} = \sum_{i \in IP} R_i \quad (8)$$

$$= \sum_{i \in IP}\left(R_i' + \sum_{j \in R(i)} \mu_{i,j,R} D_j\right)$$

$$= \sum_{i \in IP} (\eta_i D_i + R_i'),$$

where $n_i$ indicates the influence of DL on the rate of future frames referring to $f_i$. For i in $L_4$, $n_i=0$. For frames in other layers, $$\eta_i = \sum_{j \in DR(i)} \mu_{j,i,R}, i \in L_I, L_0 \ldots L_3. \quad (9)$$

Thus, together with Eq. (8), IP-level RDO can be written as, $$J = \sum_i D_i + \lambda\left(\sum_i R_i\right) \quad (10)$$

$$= \sum_i D_i + \lambda\left[\sum_i (\eta_i D_i + R_i')\right]$$

$$= \sum_i (1 + \lambda \eta_i) D_i + \lambda\left(\sum_i R_i'\right)$$

$$= \sum_i \theta_i D_i + \lambda\left(\sum_i R_i'\right),$$

where $\theta_i$ represent the cost contribution of $D_i$ to the IP-level RDO. For frames in $L_4$, $\theta_i=1$.

The distortion term in IP-level RDO is formulated in a similar way to the rate term by incorporating Eq. (1) into Eq. (10):

$$J = \sum_i \theta_i D_i + \lambda\left(\sum_i R_i'\right) \quad (11)$$

$$= \sum_i \theta_i\left(D_i' + \sum_{j \in R(i)} \mu_{i,j,D} D_j\right) + \lambda\left(\sum_i R_i'\right)$$

$$= \sum_i \xi_i D_i' + \lambda\left(\sum_i R_i'\right).$$

As such, the final RD cost is represented as a weighted version of inherent distortion and rate.

From Eq. (11), the relationship between (i and (J of frames directly referring to $f_i$ is given by:

$$\xi_i = \theta_i + \sum_{j \in DR(i)} (\mu_{j,i,D} \xi_j). \quad (12)$$

For frames in $L_4$, $\zeta_i=1$.

To ensure both intra-GOP dependency and inter-GOP dependency are accurately considered, $\zeta_i$ of each frame are calculated on an IP plus a successive GOP. $\eta_i$ and $\theta_i$ are used as intermediate values for $\zeta_i$ computation. The calculation process for $\zeta_i$ is as following.

Step one: Choose start frame index in coding order $F_{start}$ and end frame index Fad. $F_{start}$ is initialized to 0, denoting the first I frame for the sequence and is updated in Step four. $F_{end}$ denotes the last frame in encoding order of successive GOP after this IP and is defined as, $$F_{end} = \begin{cases} F_{start} + \text{intraperiod, if } F_{start} = 0, \text{ otherwise} \\ \min(F_{start} + \text{intraperiod} + GOP_{size}, N_{frames}), \end{cases}$$

where intraperiod is related to frame rate of the sequence, $GOP_{size}$, is set to 16 and $N_{frames}$ is the total number of frames. Detailed information may be found in F. Bossen, J. Boyce, X. Li, V. Seregin, K. S "uhring, JVET common test conditions and software reference configurations for SDR video, Joint Video Exploration Team (JVET), doc. JVET-M1010 (2019).

Step two: Initialize $\theta_i$ to 1, $\zeta_i$ and $\eta_i$ to 0 for frames between $F_{start}$ and $F_{end}$.

Step three: Traverse frames from $F_{end}$ to $F_{start}$ and update $\eta$, $\theta$, and $\zeta$ for current frame and its reference frames. Frames are visited from $F_{end}$ in an reverse order to coding order. For each frame $f_i$, in order to compute its dependency factors ($\mu_{i,j,D}$ and $\mu_{i,j,R}$) on each reference frame $f_j$. $\mu_{i,j,R}$ is used in Eq. (9) to update reference $\eta_j$, $$\eta_j \mathrel{+}= \mu_{i,j,R}, \text{for } j \in R(i). \tag{13}$$

Then using current $\eta_i$ and Eq. (10) to compute $\theta_i$. If current frame belongs to $L_4$, it is set $\theta_i=1$.

Subsequently, it is possible to compute ($\zeta$ for current frame, $$\zeta_i = \zeta_i + \theta_i. \tag{14}$$

Then, $\zeta_i$ and $\mu_{i,j,D}$ are used to update $\zeta_j$ of each reference frame, $$\zeta_j = \zeta_j + \mu_{i,j,D}, \text{for } j \in R(i). \tag{15}$$

Step four: Update $F_{start}$. $F_{start}$ is set to the next periodically inserted I frame.

$$F_{start} = \begin{cases} F_{start} + \text{intraperiod} - GOP_{size}, \text{ if } F_{start} = 0 \\ \min(F_{start} + \text{intraperiod}, N_{frames}), \text{ otherwise}. \end{cases}$$

Step five: Repeat Step one to Step four till the end of the sequence.

Adaptive QP Selection Method 214

In Eq. (11), derivative of j with respect to $R_i$ is taken, and the best coding performance is achieved when the derivative equals to zero:

$$\frac{\partial J}{\partial R'_i} = \xi_i \frac{\partial D'_i}{\partial R'_i} + \lambda_{IP} = 0, \tag{16}$$

which leads to $$\lambda_i = \frac{\partial D'_i}{\partial R'_i} = \frac{\lambda_{IP}}{\xi_i}. \tag{17}$$

According to Eq. (17), when $f_i$ is frame in the highest temporal layer, $\zeta_i$ equals to 1 and as $\lambda_i = \lambda_{IP}$. In other words, $\lambda_{IP}$ is same to the A of frames in highest temporal layer. In Eq. (17), by moving $\zeta$i to the left side, it is then derived to have the following relationship:

$$\zeta_i \cdot \lambda_i = \ldots = \zeta_j \cdot \lambda_j = \lambda_{IP}. \tag{18}$$

Due to the encoding processing is carried out with fixed-QP configuration, it is then suitable to impose the constraint that the average QP before and after AQP scheme should be the same. The average QP before AQP scheme can be computed as the average QP of current IP in the first-pass coding. During the first-pass coding, different temporal layers have different QPs and different number of frames. For simplicity, it can be computed that the average QP of current IP in the following two steps: Step one: The average QP of a temporal layer is computed as the average QP for all frames in this temporal layer in current IP, $$QP_{avg,l} = \frac{\sum_{i \in l} QP_i}{n_l}, \tag{19}$$

where l is the temporal layer id and $\eta_l$ is the number of frames in l in current IP.

Step two: The average QP of current IP is the average QP of all temporal layers.

$$QP_{avg} = \frac{\sum_{l \in L} QP_{avg,l}}{n_L}, \tag{20}$$

where L is the temporal layer set, consisting of $L_I, L_0 \ldots L_4$.

Herein, it is then arranged to compute the average QP of current IP given $\lambda_{IP}$. For $f_i$, its optimal A can be computed from Eq. (17) as $$\lambda_i = \frac{\lambda_{IP}}{\xi_i}. \tag{21}$$

By incorporate Eq. (21) into Eq. (7), QP for $f_i$ is $$QP_i = \frac{\log_2 \frac{\lambda_{IP}}{\xi_i} - \log_2\left(-\frac{6 \cdot MAX_f^2 \cdot \ln 10 \cdot c_i \cdot 2^{(7/6)}}{a_i \cdot SATD \cdot \ln 2 \cdot 10}\right) + \frac{d_i \cdot \log_2 10}{10}}{\frac{1}{6} - \frac{c_i \cdot \log_2 10}{10}}, \tag{22}$$

where $a_i$, $c_i$ and $d_i$ are parameters computed in parameter estimation step and SATD is $SATD_{ori,i}$ for B frame and $SATD_{i,j}$ for I frame.

The average QP after AQP 214 is computed in the same way as average QP in the first-pass coding as $$QP_{avg,2pass} = \frac{\sum_{l \in L}\left(\sum_{i \in l} QP_i\right)/n_l}{n_L}. \tag{23}$$

The QP constraint is to set $QP_{avg,2pass}$ equaling to $QP_{avg}$, such that may be solved numerically with bi-section method.

Step one: Initialize the upperbound $\lambda_{up}$ to 1200000 and lowerbound $\lambda_{low}$ to 0;

Step two: Compute $\lambda_{mid}=(\lambda_{up}+\lambda_{low})/2$ and substitute Amid into Eq. (22) to compute $QP_{avg,2pass}$;

Step three: If $|QP_{avg,2pass}-QP_{avg}|<0.0001$, stop and set $\lambda_{IP}=\lambda_{mid}$. Otherwise, If $QP_{avg,2pass}>QP_{avg}$, set $\lambda_{up}=\lambda_{mid}$. If $QP_{avg,2pass}<QP_{avg}$, set $\lambda_{low}=\lambda_{mid}$;

Step four: Repeat Step two to Step three until it stops. If the iteration number is larger than 50, the iteration may be forced to stop and set $\lambda_{low}=\lambda_{mid}$;

After $\lambda_{IP}$, is solved, the adaptive QP for each frame can be obtained by substituting $\lambda_{IP}$, into Eq. (22).

Accordingly, it may be summarized that the proposed two-pass adaptive QP selection method.

Step one: Perform the first-pass coding. Perform DMCRC for each CU and record R-D data when referring to lossless and lossy reference for B frames. Record frame-level distortion Dm, residual bits Rresi,m and SATD values after the frame is coded.

Step two: Use ζ (calculation method in dependency decoupling in RDO to compute ζi for each frame. During the computation, frame level dependency factor μi, j, R and μi, j, D are first computed as shown in in the dependency decoupling process. Frame-level inherent R-λ model parameters are obtained according to the QP-λ relationship.

Step three: Use the computed ζD and ζR with frame-level QP-λ relationship to derive IP-level λIP and modify frame level λi and QPi through the adaptive QP selection method for the second-pass coding 222.

Step four: Use the derived λi and QPi to encode the sequence in the second-pass encoding 222.

Embodiments of the present invention may be advantageous as a two-pass based adaptive QP selection method is operational for VVC to significantly improve the coding performance. In turn, the embodiments of the method or system for processing a stream of images may be used in video transmission and storage with limited source. Compared with the original VVC standard, experiments performed by the inventors indicate that it can achieve 1.82% bitrate reduction on average for the luminance channel under RA structure.

Advantageous features of example embodiments may include, without limitations:

(1) Dependent D relationship and dependent R relationship are explored under VVC and fitted with linear model. Inherent models are applied for each frame to characterize the R-D relationship when referring to lossless reference frame. Frame-level QP-λ relationship is invented through inherent models.

(2) IP-level RDO is reformulated into dependency-decoupled RDO with dependent models and inherent models. Reference relationship is precisely computed through the first-pass coding statistics.

(3) Adaptive QP for each frame is solved with dependency-decoupled RDO and proposed QP-λ relationship with fixed-QP constrain.

(4) Proposed AQP method is implemented into VVC encoder to improve the coding performance under RA structure.

(5) Extensive experimental results demonstrate the significant performance of the proposed scheme compared to the default hierarchical RA structure, in common test sequences, screen content sequences and short videos.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for processing a stream of images comprising the steps of:
    obtaining coding information from the stream of images to determine one or more relation models between bitrate and distortions; the one or more relation models representative of the bitrate/distortion relationship of the stream of images, the one or more relation models including a dependency model and an inherent model; the dependency model modelling a dependency of bitrate/distortion of a to-be-coded frame on bitrate/distortion of a reference frame; the inherent model modelling bitrate/distortion of a to-be-coded frame after inter and intra prediction on bitrate/distortion of a lossless reference frame;
    determining a set of coding parameters arranged for use to encode the stream of images with the one or more relation models,
    using the one or more relation models with the set of coding parameters to reformulate the bitrate/distortion relationship into a decoupled relationship arranged to be applied to a subset of the stream of images, and;
    using the decoupled relationship and the set of coding parameters to generate an adaptive quantization parameter for encoding the stream of images with the bitrate/distortion relationship.

2. The method for processing a stream of images in accordance with claim 1, wherein the dependency model is arranged to model a relationship of a distortion and bitrate in encoding the stream of images such that the model represents the effects of the reference frames on the to-be-coded frame given the set of coding parameters.

3. The method for processing a stream of images in accordance with claim 2, wherein the dependency model is further arranged to model the distortion of the to-be-coded frame and the distortion of the reference frame.

4. The method for processing a stream of images in accordance with claim 3, wherein the dependency model includes the bits of the to-be-coded frame and the c.

5. The method for processing a stream of images in accordance with claim 4, wherein the dependency model is represented by:

$$D_i = \sum_{j \in R(i)} \mu_{i,j,D} D_j + D'_i.$$

$$R_i = \sum_{j \in R(i)} \mu_{i,j,R} D_j + R'_i,$$

where $D_i$, $R_i$ and $R(i)$ are the distortion, bits and reference picture set of to-be-coded frame;
$D_j$ is the distortion of reference frame;
$\mu_{i,j,D}$ and $\mu_{i,j,R}$ are parameters of dependency models;
$D'_i$ and $R'_i$ are the distortion and bits of to-be-coded frame when referring to lossless reference frame;
$D'_i$ and $R'_i$ are only related to frame content; and,
QP set to the to-be-coded frame.

6. The method for processing a stream of images accordance with claim 5, wherein the dependency models are linear.

7. The method for processing a stream of images in accordance with claim 1, wherein the step of generating the adaptive quantization parameter is performed by using a QP-λ relationship and the decoupled relationship.

8. The method for processing a stream of images in accordance with claim 7, wherein the QP-λ relationship is derived from the inherent model.

9. The method for processing a stream of images in accordance with claim 8, wherein the QP is represented by:

$$QP = \frac{\log_2 \lambda - \log_2 \left( -\frac{6 \cdot MAX_f^2 \cdot \ln 10 \cdot c \cdot 2^{(\gamma/6)}}{a \cdot SATD \cdot \ln 2 \cdot 10} \right) + \frac{d \cdot \log_2 10}{10}}{\frac{1}{6} - \frac{c \cdot \log_2 10}{10}}.$$

10. The method for processing a stream of images in accordance with claim 9, wherein the bitrate/distortion relationship is the weighted sum of the inherent model.

11. The method for processing a stream of images in accordance with claim 10, wherein the method is used in a codec/decode.

12. The method for processing a stream of images in accordance with claim 11, wherein the codec/decode is the Versatile Video Coding (VVC).

13. A system for processing a stream of images comprising:
a decoding processor arranged to obtain coding information from the stream of images to determine one or more relation models between bitrate and distortions; the one or more relation models representative of the bitrate/distortion relationship of the stream of images; the one or more relation models including a dependency model and an inherent model; the dependency model modelling a dependency of bitrate/distortion of a to-be-coded frame on bitrate/distortion of a reference frame; the inherent model modelling bitrate/distortion of a to-be-coded frame after inter and intra prediction on bitrate/distortion of a lossless reference frame;
a parameter estimation processor arranged to determine a set of coding parameters arranged for use to encode the stream of images with the one or more relation models; and,
a quantization parameter processor arranged to reformulate the bitrate/distortion relationship, using the one or more relation models with the set of coding parameters, into a decoupled relationship arranged to be applied to a subset of the stream of images, and using the decoupled relationship and the set of coding parameters to determine an adaptive quantization parameter for an encoder to encode the stream of images with the bitrate/distortion relationship.

14. The system for processing a stream of images in accordance with claim 13, wherein the dependency model is arranged to model a relationship of a distortion and bitrate in encoding the stream of images such that the model represents the effects of the reference frames on the to-be-coded frame given the set of coding parameters.

15. The system for processing a stream of images in accordance with claim 14, wherein the dependency model is further arranged to model the distortion of the to-be-coded frame and the distortion of the reference frame.

16. The system for processing a stream of images in accordance with claim 15, wherein the dependency model includes the bits of the to-be-coded frame and the bits of the reference frame.

17. The system for processing a stream of images in accordance with claim 16, wherein the dependency model is represented by:

$$D_i = \sum_{j \in R(i)} \mu_{i,j,D} D_j + D'_i.$$

$$R_i = \sum_{j \in R(i)} \mu_{i,j,R} D_j + R'_i,$$

where $D_i$, $R_i$ and $R(i)$ are the distortion, bits and reference picture set of to-be-coded frame;
$D_j$ is the distortion of reference frame;
$\mu_{i,j,D}$ and $\mu_{i,j,R}$ are parameters of dependency models;
$D'_i$ and $R'_i$ are the distortion and bits of to-be-coded frame when referring to lossless reference frame;
$D'_i$ and $R'_i$ are only related to frame content; and,
QP set to the to-be-coded frame.

18. The system for processing a stream of images in accordance with claim 17, wherein the dependency models are linear.

19. The system for processing a stream of images in accordance with claim 13, wherein the step of generating the adaptive quantization parameter is performed by using a QP-λ relationship and the decoupled relationship.

20. The system for processing a stream of images in accordance with claim 19, wherein the QP-λ relationship is derived from the inherent model.

21. The system for processing a stream of images in accordance with claim 20, wherein the QP is represented by:

$$QP = \frac{\log_2 \lambda - \log_2 \left( -\frac{6 \cdot MAX_f^2 \cdot \ln 10 \cdot c \cdot 2^{(\gamma/6)}}{a \cdot SATD \cdot \ln 2 \cdot 10} \right) + \frac{d \cdot \log_2 10}{10}}{\frac{1}{6} - \frac{c \cdot \log_2 10}{10}}.$$

22. The system for processing a stream of images in accordance with claim 13, wherein the bitrate/distortion relationship is the weighted sum of the inherent model.

* * * * *